(12) United States Patent
Bill et al.

(10) Patent No.: US 12,241,484 B2
(45) Date of Patent: Mar. 4, 2025

(54) VALVE

(71) Applicant: HYDAC FLUIDTECHNIK GMBH, Sulzbach/Saar (DE)

(72) Inventors: Markus Bill, Eppelborn (DE); Philipp Hilzendegen, Wadern (DE); Nicola-Vincenzo Porta, Neunkirchen (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 18/035,153

(22) PCT Filed: Oct. 27, 2021

(86) PCT No.: PCT/EP2021/079837
§ 371 (c)(1),
(2) Date: May 3, 2023

(87) PCT Pub. No.: WO2022/106168
PCT Pub. Date: May 27, 2022

(65) Prior Publication Data
US 2024/0011511 A1  Jan. 11, 2024

(30) Foreign Application Priority Data
Nov. 20, 2020  (DE) ............ 10 2020 007 098.1

(51) Int. Cl.
F15B 13/02  (2006.01)
F15B 13/00  (2006.01)
(Continued)

(52) U.S. Cl.
CPC ............ *F15B 13/024* (2013.01); *F15B 13/01* (2013.01); *F15B 13/044* (2013.01);
(Continued)

(58) Field of Classification Search
CPC ......... Y10T 137/7765; Y10T 137/7766; F15B 13/01; F15B 13/024; F15B 13/0405;
(Continued)

(56) References Cited

U.S. PATENT DOCUMENTS 1,807,191 A * 5/1931 Boyle ................. F16K 31/408
 251/38
1,848,031 A * 3/1932 Spencer .............. F16K 17/383
 236/80 R
(Continued)

FOREIGN PATENT DOCUMENTS

DE  103 25 178  1/2005
DE  10 2007 011 127  10/2007
(Continued)

OTHER PUBLICATIONS

International Search Report (ISR) issued Feb. 8, 2022 in International Application No. PCT/EP2021/079837.

*Primary Examiner* — William M McCalister
(74) *Attorney, Agent, or Firm* — Wenderoth, Lind & Ponack, L.L.P.

(57) ABSTRACT

A valve, in particular having the form of a 2/2-way seat valve includes a pressure limiting function (28) integrated in a joint valve body to implement a thermal overpressure protection.

14 Claims, 3 Drawing Sheets

(51) Int. Cl.
  *F15B 13/01* (2006.01)
  *F15B 13/04* (2006.01)
  *F15B 13/044* (2006.01)
  *F15B 21/045* (2019.01)
  *F16H 61/4017* (2010.01)
  *F16K 17/04* (2006.01)
  *F16K 31/06* (2006.01)
  *G05D 16/20* (2006.01)

(52) U.S. Cl.
  CPC .......... *F15B 21/045* (2013.01); *F16K 17/048* (2013.01); *F16K 31/0655* (2013.01); *F16K 31/0675* (2013.01); *G05D 16/2097* (2019.01); *F15B 2013/004* (2013.01); *F15B 13/0405* (2013.01); *F15B 2013/0448* (2013.01); *F15B 2211/30515* (2013.01); *F15B 2211/50518* (2013.01); *F15B 2211/5153* (2013.01); *F16H 61/4017* (2013.01)

(58) Field of Classification Search
  CPC .... F15B 13/044; F15B 21/045; F15B 17/048; F15B 31/0675; F15B 2013/004; F15B 2013/0448; F15B 2211/30515; F15B 2211/50518; F15B 2211/5153; F16K 31/0655; F16H 61/4017; G05D 16/2097
  USPC .................................................. 137/490, 491
  See application file for complete search history.

(56) References Cited

U.S. PATENT DOCUMENTS

| | | | | |
|---|---|---|---|---|
| 2,017,840 A * | 10/1935 | Brooks | ..................... | E03D 3/04 251/38 |
| 2,271,850 A * | 2/1942 | Zinkil | ..................... | G05D 23/10 251/38 |
| 3,033,228 A * | 5/1962 | Mohler | ................. | F16K 31/408 251/30.04 |
| 3,791,578 A * | 2/1974 | Brand | ........................ | F16T 1/02 251/38 |
| 3,962,884 A * | 6/1976 | Widdowson | ............ | F25B 41/22 62/224 |
| 4,113,174 A * | 9/1978 | Kagiyama | .......... | G05D 23/1858 251/38 |
| 4,268,006 A * | 5/1981 | Kunz | ..................... | F16K 31/404 251/38 |
| 4,500,067 A * | 2/1985 | Zukausky | ............ | F16K 31/404 251/30.01 |
| 4,508,132 A * | 4/1985 | Mayfield, Jr. | ........... | F16L 55/00 251/63.4 |
| 4,665,942 A * | 5/1987 | Altman | ................... | F16K 17/22 137/498 |
| 5,460,198 A * | 10/1995 | Kortge | .................. | B62D 5/062 137/490 |
| 10,907,749 B2 * | 2/2021 | Lee | ..................... | F16K 31/0693 |
| 2005/0097887 A1 | 5/2005 | Landhuis | | |
| 2006/0054225 A1 | 3/2006 | Hillesheim et al. | | |
| 2006/0273270 A1 * | 12/2006 | Bill | ........................ | F15B 11/05 251/44 |
| 2007/0210270 A1 | 9/2007 | Stephenson et al. | | |
| 2009/0301578 A1 * | 12/2009 | Bruck | ................. | F16K 31/0655 137/488 |
| 2010/0294962 A1 * | 11/2010 | Bill | ....................... | F16K 31/408 251/30.01 |
| 2011/0297856 A1 * | 12/2011 | Bill | ..................... | G05D 16/2097 251/129.15 |
| 2012/0037829 A1 * | 2/2012 | Bill | ..................... | F15B 13/0442 251/324 |
| 2012/0037830 A1 * | 2/2012 | Bill | ..................... | F16K 31/0668 251/324 |
| 2012/0285568 A1 * | 11/2012 | Schulz | ................ | F15B 13/0435 251/30.01 |
| 2012/0292540 A1 * | 11/2012 | Bruck | ................. | F16K 31/0613 251/14 |
| 2012/0305108 A1 * | 12/2012 | Jerchen | ................. | F16K 17/105 137/488 |
| 2014/0007964 A1 | 1/2014 | Schulz et al. | | |
| 2016/0195114 A1 * | 7/2016 | Schneider | ........... | F15B 13/0401 137/554 |
| 2017/0321820 A1 * | 11/2017 | Schulz | ................... | F16K 31/406 |
| 2018/0039291 A1 * | 2/2018 | Hess | ....................... | F16K 17/04 |
| 2019/0170270 A1 * | 6/2019 | Ohnmacht | .............. | F16K 39/02 |
| 2019/0249693 A1 * | 8/2019 | Hilzendegen | ............ | F15B 13/01 |
| 2021/0089061 A1 * | 3/2021 | Bill | ..................... | G05D 16/101 |
| 2024/0011511 A1 * | 1/2024 | Bill | ..................... | F16K 31/0675 |

FOREIGN PATENT DOCUMENTS

| | | |
|---|---|---|
| DE | 10 2011 010 474 | 8/2012 |
| DE | 10 2013 002 794 | 8/2014 |
| DE | 10 2015 007 689 | 12/2016 |
| DE | 10 2019 202 256 | 8/2020 |

\* cited by examiner

VALVE

FIELD OF THE INVENTION

The invention relates to a valve, in particular having the form of a 2/2-way seat valve. Such valves or seat valves, respectively, are regularly used to actuate hydraulic cylinders for the purpose of moving and holding loads. When the valve is closed, i.e. when it assumes a fluid-blocking position, the connected hydraulic cylinder maintains its position, even when the hydraulic cylinder is subjected to a load.

BACKGROUND OF THE INVENTION

If, on the other hand, such a valve or seat valve shuts off the oil volume in the cylinders and supply lines for long periods of time, thermal effects can cause the pressure to rise far above the permissible system pressure, especially under the influence of insolation, resulting in damage to system components such as the hydraulic hoses. This occurrence is particularly important when the hydraulic system is used for machines that are operated outdoors, such as excavators or agricultural vehicles.

To overcome this problem, it has been proposed in the freely available prior art (see FIG. 1) to connect a pressure relief valve in parallel to a (control) valve. The pressure relief valve has to be set in such a way that for pressure above the system pressure the valve can be opened and the pressure can be released to the tank. Because the described pressure increase is based on the thermal expansion of the oil volume, the amount of oil to be discharged in the range of a small amount of fluid is regularly in the range of a few drops. This means that only very small volume flows to be handled occur.

Accordingly, in the state of the art (see FIG. 1), solutions have become established, in which 2/2 directional control valves are used to extend and retract hydraulic support cylinders. In the operated state, the valve ensures fluid flow both to and from the cylinder. In the rest position, it encloses the fluid volume, and thus, prevents the force acting on the cylinder from dropping.

In this known solution, thermal overpressure protection is implemented by connecting the pressure relief valve in parallel with the directional control valve, as explained above. Owing to the small amount of fluid to be discharged and the large span between the set pressure and system pressure, this pressure relief valve does not have to meet high accuracy requirements. However, the disadvantage of the known solution is the additional space required for the pressure relief valve and the need to provide an additional component as such for the hydraulically operated circuit, which in turn increases the operating weight of the known solution.

SUMMARY OF THE INVENTION

Based on this state of the art, the invention addresses the problem of avoiding the disadvantages of the state of the art described above. According to the invention, this problem is basically solved by a valve having the features of a pressure limiting function integrated in a joint single valve body for implementing a thermal overpressure protection. Only one valve is used to implement both the control function and the pressure limiting function, preferably for a hydraulic cylinder that can be connected to the valve. This structure is without parallel in the prior art.

By omitting an independent pressure relief valve next to the control valve generally implemented as a 2/2-way seat valve as shown in the prior art, weight and costs can be saved and the otherwise additionally required piping between the directional seat valve and the pressure relief valve can be omitted. In this respect, the lengths of the line sections exposed to thermal stress are also reduced, which is beneficial to the operational reliability of the valve according to the invention.

In a preferred embodiment of the valve according to the invention, provision is made for the valve body to have at least one inflow hole and one outflow hole, which can be interconnected in a fluid-conveying manner or separated from each other by a valve piston that can be actuated by a magnetic system. In this way, the magnetic system can be used to reliably actuate the valve independently of its pressure relief function, i.e. operated as a control valve to establish and block a fluid connection.

In another preferred embodiment of the valve according to the invention, provision is made for the valve piston to have two orifice holes, one of which is designed as a fixed orifice and the other as a variable orifice. Also preferably, provision is made for the variable orifice to be actuated by a control rod, which has a control cone at one of its free ends, which is used to preset the free opening cross section of the variable orifice.

When the variable orifice opens, a volume flow flowing through both orifices is established, which in turn generates a pressure drop in the direction of flow downstream of the orifice and, assuming a state of equilibrium between the pressure forces acting on the valve piston and the volume flows flowing through the orifices, the valve piston follows the guide rod and the valve reaches its open state. In addition, a varying opening cross-section at the variable orifice results, which leads to good actuating behavior.

In a further preferred embodiment of the valve according to the invention, provision is made for the magnetic system to have an armature piston mounted for longitudinal motion in a pole tube, which armature piston, electromechanically operated by an energizable solenoid, lifts the valve piston off a valve seat in a valve housing as part of the valve body and opens a fluid path from the inflow hole to the outflow hole. In this way, the electromechanical operation of the valve, independently of its pressure limiting function, is guaranteed by simple means at a low energy input in any case. This guarantee is made possible by a linkage part, which, at one of its free ends, transitions into a driver system accommodated in the magnet armature, the free end of which is accommodated in the solenoid armature so as to be longitudinally displaceable with a predeterminable axial motion clearance. In this way, the driver system permits motion only in one direction of valve displacement.

In a further preferred embodiment of the valve according to the invention, provision is made for the armature piston to be movable via a linkage part, which is present in addition to the control rod and which is led out of the pressurized area of the fluid volume enclosed in the valve housing and the pole tube as a further part of the valve body and which can be moved against the action of an energy accumulator, in particular in the form of a compression spring. The diameter of the linkage part forms a pressure-effective surface, the force of which acts against the energy accumulator or the compression spring, and the fact that the linkage part is mechanically secured to a plate spring, against which one of the free ends of the energy accumulator in the form of the compression spring rests. The compression spring counteracts the described pressure forces acting on the linkage, which are composed of the system pressure and any excess pressure that may have developed. Preferably, the plate spring and the compression spring are accommodated in a pole core, i.e. another part of the valve body, which adjoins the pole tube as an extension. In this way, the plate spring connected to the linkage part can preferably be provided with an option of manual operation to provide a mechanical actuation for the valve in addition to the electrical and hydraulic types of actuation.

In a further preferred embodiment of the valve according to the invention, provision is made for the free end of the control rod, which is opposite from the control cone, to be guided in a longitudinally movable manner in the solenoid armature with a predeterminable axial motion clearance. In this way, the valve can be reliably actuated, and the solenoid armature only opens the variable orifice in the valve piston via the control rod when a defined operation situation occurs.

It has been found to be particularly preferable to use the above-described valve in hydraulic systems with at least one hydraulic cylinder that can be subjected to a load, the piston end of a piston-rod-unit of which is connected to the inflow hole in the valve body of the valve. In this way, the respective hydraulic cylinder can be reliably actuated and a pressure reduction function can be achieved at the same time using only one valve.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
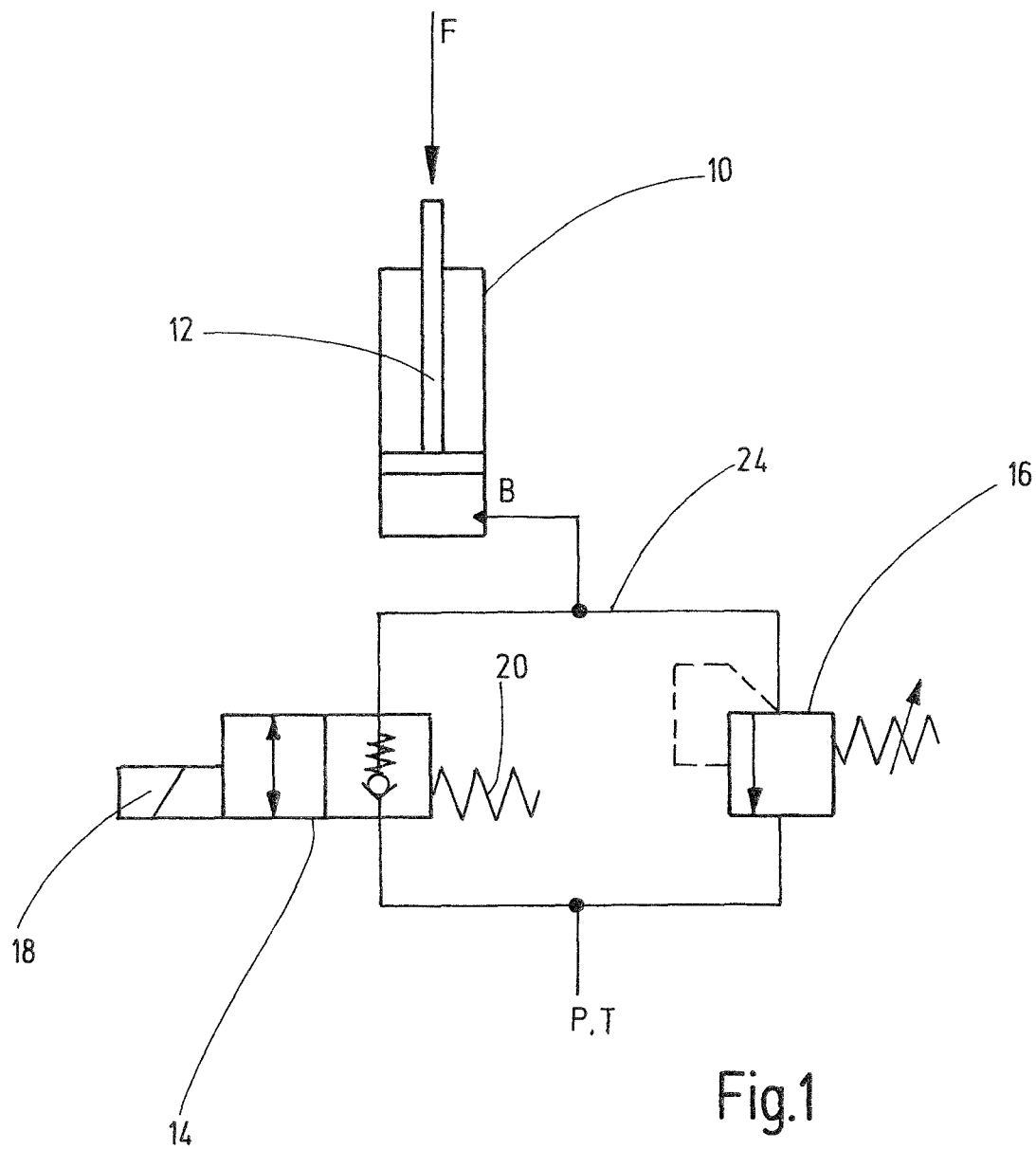
FIG. 1 is a hydraulic circuit diagram according to the relevant state of the art.

FIG. 1 shows essential parts of a complete hydraulic system with a hydraulic power cylinder or hydraulic cylinder 10. In the customary manner, the hydraulic cylinder 10 has a piston-rod-unit 12, to which a force can be applied, for instance in the form of a weight force, indicated by the force arrow F. At its piston end, the hydraulic cylinder 10 is connected in a fluid-conveying manner to a pressure relief valve 16 via a port B and matching connecting lines on the one hand to a 2/2-way seat valve 14 and on the other hand. Thus, while the outlet ends of the valves 14, 16 are connected to the hydraulic cylinder 10, the inlet ends of these aforementioned valves can be optionally connected to a pressure supply source P, for instance in the form of a hydraulic pump, and to a tank port T.

The 2/2-way seat valve 14 is shown in its closed state and the piston end of the hydraulic cylinder 10, as a hydraulic locking cylinder, can even under load F be supported by the valve 14 in such a way that no unintentional retraction of the cylinder 10 can occur. If, on the other hand, the valve 14 is regularly switched by a magnetic system 18 against the action of an energy accumulator in the form of a compression spring 20, the piston end is supplied with a fluid volume of predeterminable pressure from the pressure supply P via the port B of the cylinder 10 as required, and the piston-rod-unit 12 of the hydraulic cylinder 10 extends upwards to an upper stop position, as viewed in the direction of view of FIG. 1, against the force arrow F. The piston-rod-assembly 12 can extend even when the directional seat valve is de-energized because it includes a check function from port 36 to port 32 when in the home position, i.e., de-energized. If, on the other hand, the inlet end of the switched valve 14 is connected to the tank port T as required or to a tank connected thereto, the fluid volume on the piston end of the cylinder 10 is emptied, which piston then retracts downwards as viewed in the direction of FIG. 1. What is not shown in more detail in FIG. 1, the inlet end of the valve 14 can then be connected to the pressure supply P on the one hand and to the tank T on the other hand, for which purpose another valve (not shown) can be used.

The magnetic system 18 for operating the valve 14 has, In the usual manner, a coil that can be energized and is not shown in more detail. When the coil is energized, a solenoid armature or armature piston 22 (cf. FIG. 2) is moved, thereby bringing the valve 14 into its effectively conducting open state. When the magnetic system 18 is not energized, on the other hand, the compression spring 20 returns the armature piston 22 to its blocking starting position shown in FIG. 1.

As explained above, in the fluid lines forming a piping 24 between the valves 14, 16 and the cylinder 10 an unwanted expansion of the oil volume, for instance due to insolation, can occur in the event of a temperature increase, when the valve 14 is not operated and thus the oil column is trapped and pressurized, and as a result this unwanted expansion can cause an increase in pressure, which can lead to damage of the piping 24. To counteract, the pressure relief valve 16 is connected in parallel to the valve 14 in the hydraulic supply circuit for the cylinder 10, which opens at a presettable threshold pressure and discharges excess fluid volume to the opened tank port T. Due to the small amount of fluid to be discharged and the large span between the set pressure and the system pressure, the pressure relief valve 16 of the prior art does not have to meet high standards in terms of setting accuracy, but it does have to meet high standards in terms of its closing hysteresis. After the overpressure has been relieved, the pressure relief function of the valve has to close again without leakage to prevent any slow lowering of the load. The described pressure increase due to the thermal expansion of the oil volume in the piping 24 is in the range of a few oil drops for the oil volume to be discharged via the pressure relief valve 16 in the direction of the tank T. Consequently, the pressure relief valve 16 according to the state of the art only has to be able to handle minute volume flows. It makes sense to use seat valves instead of conventional directional control valves, because the valve seat of the valve piston ensures that even high stress forces F on the cylinder 10 can be reliably handled when the valve 14 is not operated. In particular, seat valves should be given preference over spool valves, because otherwise the typical leakage of spool valves would cause a slow lowering of the load.

Figure 2A:
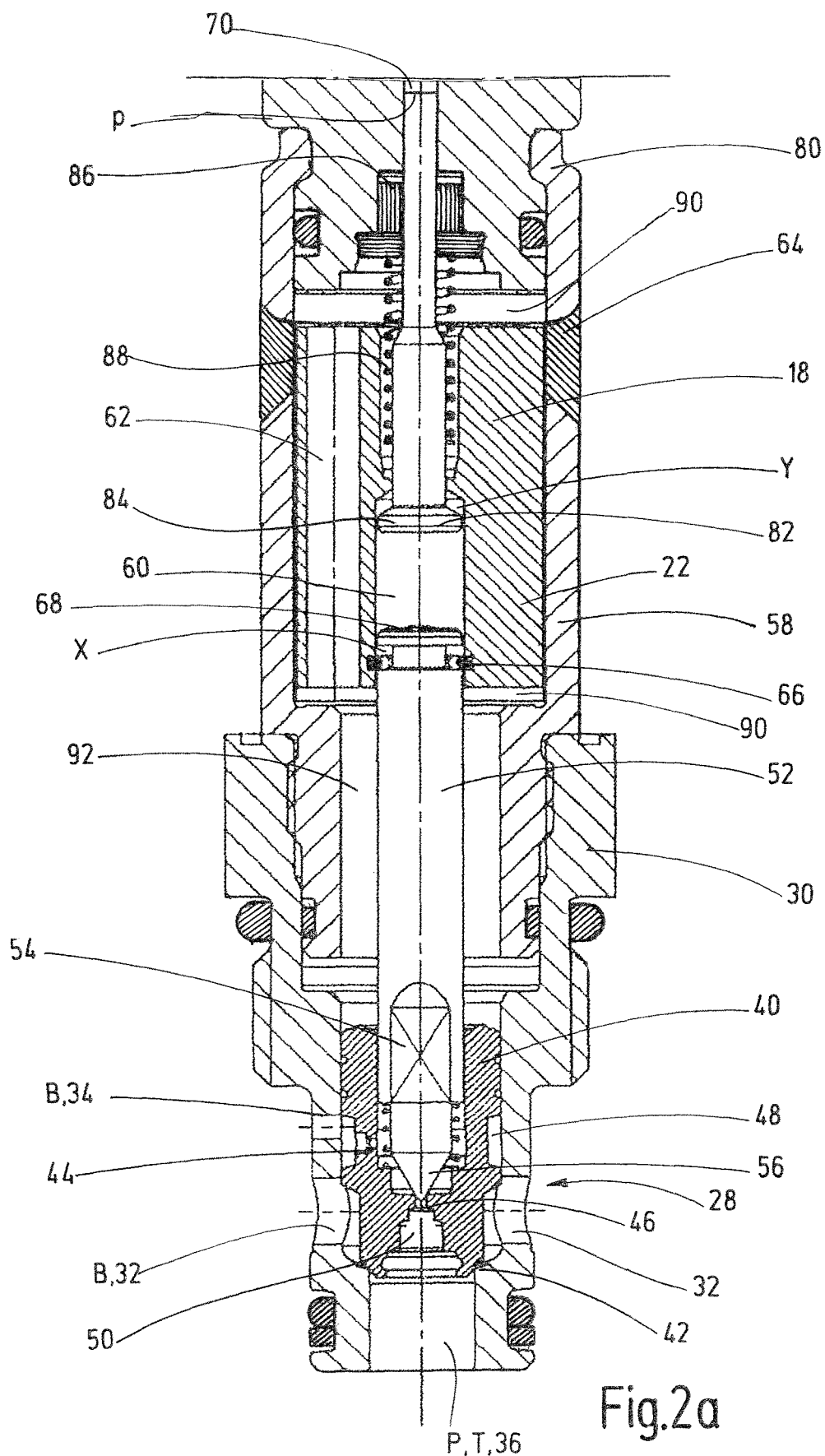
FIG. 2a is a side view in section through a lower part of a valve according to an exemplary embodiment of the invention, without the coil winding of the assigned magnetic system.
Figure 2B:
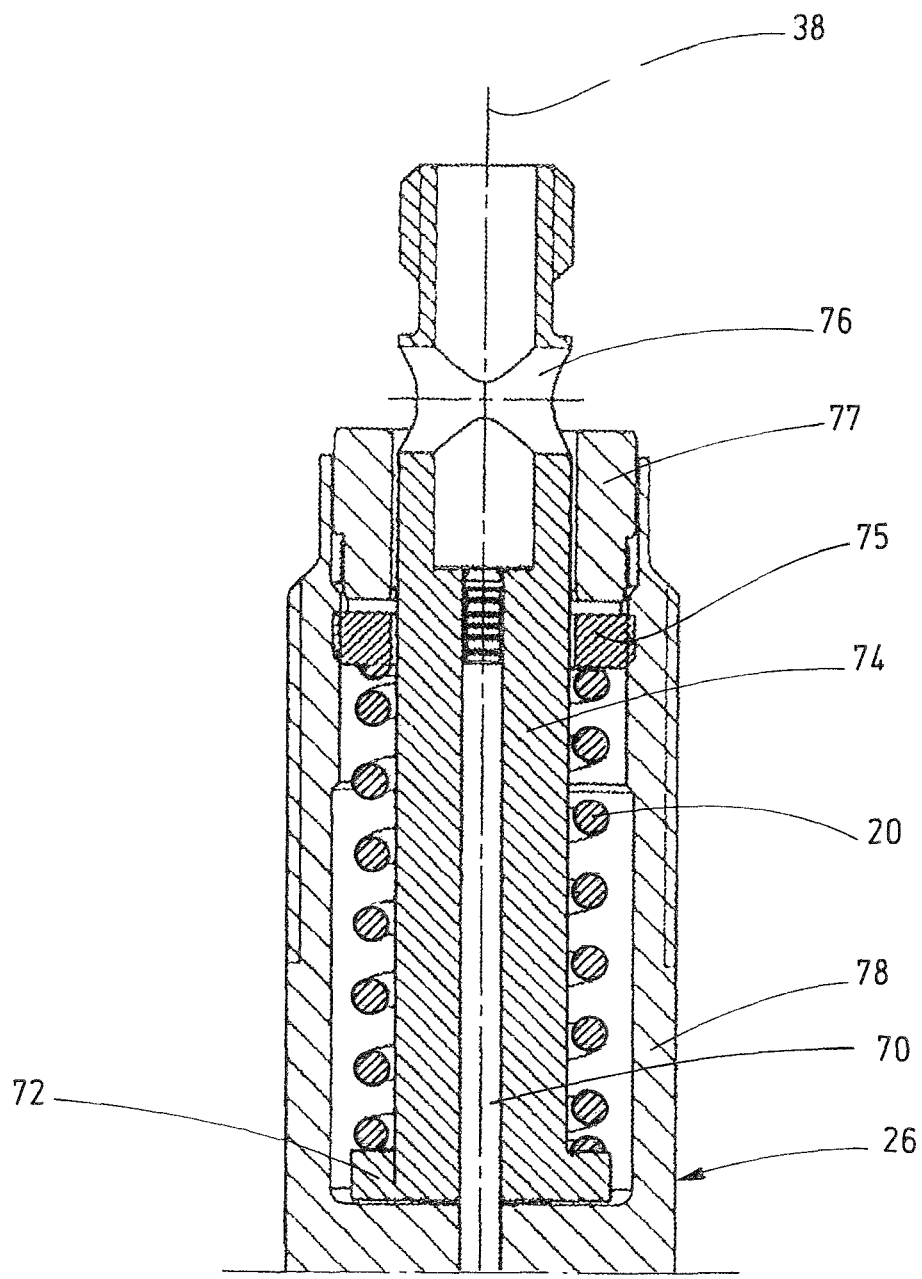
FIG. 2b is a side view in section through a top part of the valve according to the exemplary embodiment of the invention, wherein FIGS. 2a and 2b hereinafter are referred to as FIG. 2 in their entirety.

The valve according to the invention shown in longitudinal section in FIG. 2 is designed in the form of such a 2/2-way seat valve 14 according to FIG. 1. To implement a thermal overpressure protection, the valve now has an integrated pressure relief function in a joint valve body 26, which as a whole is designated by the numeral 28. In this respect, in the solution according to the invention, the known valves 14, 16 according to FIG. 1 are combined in a joint valve body 26. As part of the valve body 26, a valve housing 30 is provided, which can be screwed into a valve block (not shown) in the usual manner and therefore not shown in more detail, wherein the valve housing 30 has, in addition to the threaded section provided for this purpose, corresponding annular sealing systems on the outer circumference for installation purposes.

The valve body 30 further includes inflow holes 32, 34 and an outflow hole 36. The inflow holes 32 diametrically opposite from each other with respect to the longitudinal axis 38 of the valve have a larger diameter than the superposed single inflow hole 32 viewed in the direction of view of FIG. 2, several of which may be distributed around the outer circumference of the valve housing 30 if necessary. The inflow holes 32, 34 made radially in the valve housing 30 are connected to the cylinder port B (FIG. 1), whose fluid supply to the inflow holes 32, 34 is implemented in the valve block. At its lower end face, a central outflow hole 36 penetrates the valve housing 30, which outflow hole extends concentrically to the aforementioned longitudinal axis 38 in the valve housing 30 and which forms a type of tank port T for the return of the fluid to a storage tank not shown in more detail, but which can also be connected alternatively for a pressure supply to a pressure supply source P (hydraulic pump) in case of need.

A valve piston 40, which can be actuated by the magnetic system 18 only partially shown in FIG. 2 can be used to interconnect the valve housing 30 including the inflow holes 32, 34 and the outflow hole 36 in a fluid-conveying manner or to separate them from each other. The valve piston 40 is at least partially guided for longitudinal motion in the valve housing 30 and has at its lower free end face as viewed in the direction of FIG. 2 a type of valve cone, which, in conjunction with adjacent wall parts of the valve housing 30, forms a valve seat 42, which seals tightly when the valve is closed. Furthermore, the valve piston 40 has two orifice holes, one of which is a fixed orifice 44 and the other of which is a variable orifice 46. If necessary, a plurality of fixed orifices 44 may also be provided along the outer circumference of the valve piston 40, whereas the variable orifice 46 extends through the valve piston in radial concentric orientation with the longitudinal axis 38 in the direction of the outflow hole 36 in a fluid-conveying manner. The maximum possible orifice cross-section of the variable orifice 46 is larger in diameter than the diameter of the fixed orifice 44. Both orifices 44, 46 are recessed in the valve piston 40, wherein the fixed orifice 44 opens out into an annular groove 48 on the outer circumference of the valve piston 40 through a transverse bore. In every travel position of the valve piston 40, the annular groove 48 overlaps the inflow hole 34 having the smaller diameter in the valve housing 30 than the annular groove 48. In the axial direction of the valve piston 40 and in coaxial arrangement to the longitudinal axis 38, a type of stepped bore 50 is arranged on the free end face of the valve piston 40, to which the variable orifice 46 adjoins forming a fluid passage.

The variable orifice 46 is actuated by a control rod 52, one free end of which bears a control cone 56 in extension of a flat piece 54, which control cone 56 can be used to preset the free opening cross-section of the variable orifice 46. The cylindrical transition part of the control cone 56 to the flat piece 54 is encompassed by a compression spring having a low spring constant, which attempts to lift the control cone 56 off the valve piston 40 to open the variable orifice 46 to prevent jamming during operation.

The magnetic system 18 has an armature piston 22 or solenoid armature mounted for longitudinal motion in a pole tube 58, which is electro-mechanically operated by the energizable solenoid (not shown), lifting the valve piston 40 off its valve seat 42 and opening a fluid path from inflow to outflow holes 32, 34; 36. For this purpose, the upper free end of the control rod 52 penetrates a passage 60 as a cavity, as viewed in the direction of FIG. 2. The armature piston 22 is penetrated by a longitudinal bore 62, which permits fluid to be transferred from its front end to its rear end and vice versa. The pole tube 58 has a magnetic separator 64 in the usual manner, and in the closed state of the valve shown in FIG. 2, the upper edge of the armature piston 22 is flush with the upper inward section of the magnetic separator 64. As can also be seen in FIG. 2, the free end of the control rod 52, which is opposite from the control cone 56, is guided for longitudinal motion in the solenoid armature or armature piston 22 with a predeterminable axial motion clearance X. For this purpose, a snap ring 66 is inserted on the inner circumference of the passage or cavity 60, which is penetrated by a driver rod of reduced cross-section as part of the control rod 52, which in this respect has a plate-shaped widening 68 at the end.

Furthermore, a linkage part 70, which is provided in addition to the control rod 52, can be used to move the armature piston 22, which linkage part is led out of a pressurized area of the fluid volume enclosed in the valve housing 30 and in the pole tube 58 as a further part of the valve body 26, and which linkage part can be moved counter to the action of the energy accumulator, in particular in the form of the compression spring 20. The linkage part 70 is firmly connected to a plate spring 72, against which the lower free end of the energy accumulator in the form of the compression spring 20 rests. The plate spring 72 is an integral part of a sleeve 74, which is equally penetrated by the upper end section of the rod-like linkage part 70. The sleeve 74 can be moved in a pole core 78 in the manner of a spindle drive via a handle 76, wherein it can be used to set the preload of the compression spring 20. The sleeve 74 having the plate spring 72 does not have a thread, but is passed through the setting screw (or setting nut). The compression spring is set by the setting nut 75 in FIG. 2. It has a male thread that engages with a female thread of the pole core 78. Furthermore, an anti-adjustment device 77 is provided. The sleeve-shaped pole core 78 is also part of the valve body 26 as a whole and the lower end of the pole core 78 opens out in the direction of the armature piston 22, wherein a flared connection 80 at the upper end of the pole tube 58 is used to secure the pole core 78 to the pole tube 58. The lower free end of the linkage part 70 is guided in the armature piston 22, to form a kind of driver system or drive 82, which has a widening 84 in the armature piston 22. The lower free end of the linkage part 70, which is widened, transitions as a component of the driver system 82 into the plate-shaped widening 84, which is guided in the passage 60 and, in the position of the armature piston 22 shown, has an axial motion clearance Y relative to the solenoid armature or armature piston 22. Furthermore, the rod section of the linkage part 70, which is thinner in cross-section, passes through a seal package or seal 86 in the pole core 78, which is enclosed on the outer circumference by a sealing ring, which provides the seal between the pole tube 58 and the pole core 78. Furthermore, again a compression spring having a low spring stiffness is provided, the upper end of which rests against the seal package 86 for unrestrained operation and the lower end of which rests against the assignable recess 88 in the armature piston 22.

As FIG. 2 concerning the closed state further shows, the armature piston 22 is guided longitudinally displaceably, having at its two opposite end faces a freely predeterminable travel path in the armature space 90 of the pole tube 58. The axial distance to the lower end face of the pole core 78 is somewhat greater than the underlying distance between the lower end wall of the armature piston 22 and the inner wall of the pole tube 58 drawn inwards in a shoulder-shaped manner, which pole tube is screwed downwards into the shoulder-shaped widening of the valve housing 30. In this way, even in the closed state of the valve shown in FIG. 2, a fluid-conveying connection is established via the upper inflow hole 34, the annular groove 48 and the adjoining fixed orifice 44 and via the cylindrical reduction of the control rod 52 in conjunction with the flat piece 54 into an enclosure 92, which is arranged in the pole tube 58 and through which the control rod 52 passes. Starting from this enclosing space 92, there is a further fluid-conveying connection via the lower part of the armature space 90 and via the longitudinal drilled hole 62 in the armature piston 22 in the direction of the upper part of the armature space 90. From there, in turn, a fluid connection to the passage 60 in the armature piston 22 used as a cavity is created via the recess 88 in the armature piston 22, wherein the central recess 88 extends there along the longitudinal axis 38 extending in parallel to the longitudinal bore 62 of the armature piston 22 arranged at the edge.

For a better understanding, the valve design described above will now be explained in more detail on the basis of its mode of operation. As explained above, the new inventive solution combines the function of a 2/2-way seat valve 14, with that of an adjustable pressure relief valve 16, in which its pressure function is implemented in one valve component, i.e., using a joint valve body 26. In so doing, the compression spring 20, which can be mechanically set by the setting nut 75, is coupled to the actuation system 18 of the valve piston 40 of the seat valve 14. The valve design shown in FIG. 2 is composed of the valve housing 30, the pole tube 58 and the pole core 78, which as a whole form the valve body 26 in a series arrangement. In this respect, the valve body 26 contains the valve piston 40, which separates the inflow and outflow holes 32, 34; 36 from each other via a seat geometry in the form of the valve seat 42. Further, the valve piston 40 is provided with two orifice holes 44, 46, wherein one is a fixed orifice 44 and the other is a variable orifice 46. The opening cross-section of the variable orifice 46 is varied via the tapered seat geometry in the form of the control cone 56 located on the guide rod or control rod 52.

If the variable orifice 46 opens, a volume flow flowing via both orifices 44, 46 is established, which volume flow in turn generates a pressure drop in the direction of flow downstream of the fixed orifice 44. Assuming a state of equilibrium of the pressure forces acting on the valve piston 40 and the volume flows through the orifices 44, 46, the valve piston 40 follows the control rod 52 in its upwards motion and consequently the valve enters its open state. In addition, an opening cross-section is set at the variable orifice 46. Depending on the operating state, the piston end of the hydraulic cylinder 10 then receives a fluid of predeterminable pressure from the pressure supply P via the port B, wherein the port B is connected to the inflow hole 32 having the larger cross-section in the valve housing 30. However, if the hydraulic system is kept depressurized, the fluid on the piston end of the cylinder 10 will flow towards the tank port T via the fluid port B and then to the tank or any other low-pressure source. Both the pressure supply and the discharge in the direction of low pressure, are routed via the inflow bore 36 along the free end face of the valve housing 30.

The guide rod or control rod 52 is moved electromechanically via the armature piston 22 mounted in the pole tube 58 by the magnetic system or drive 18. Further, the armature piston 22 may be moved by an additional linkage part 70 exiting the pressurized area of the fluid volume enclosed in the valve and the pole tube 58. The diameter of this linkage part 70 forms a pressure-effective surface p, the force of which acts against the compression spring 20.

As explained above, the linkage part 70 is mechanically firmly connected to the plate spring 72 of the sleeve 74, on which the compressive force of the compression spring 20 acts. In this respect, it counteracts the described pressure forces acting on the linkage part 70, which is composed of the system pressure and any excess pressure that may have developed. If the pressure acting on the pressure-effective area (circular area) p of the reduced-diameter upper linkage part 70 exceeds a preset level, the area actuates the armature piston 22 and thus the control rod 52. This action opens at least the variable orifice 46 and the excess fluid quantity assuredly flows off. Thus, if a pressure increase occurs unintentionally in the piping 24 of the hydraulic system with the hydraulic cylinder 10 mentioned above, for instance due to a temperature increase because of insolation, and if otherwise the seat valve 14 remains in its closed state shown in FIG. 2, there is a pressure increase on the pressure-effective surface p at the upper rod part of the linkage part 70 due to the already mentioned fluid connection resulting in the opening of the variable orifice 46, such that the temperature causes a fluid volume flow from the inflow hole 34, the fixed orifice 44 and via the opened variable orifice 46 and the stepped bore 50 in the direction of the outflow hole 36 until the control cone 56 of the control rod 52 closes the variable orifice 46 again due to a matching drop in pressure at the pressure-effective area p. The setting screw can be used to set the spring force and thus the opening pressure for the described relief process.

The pressures encountered during normal operation cause the linkage part 70 and the armature piston 22 to move, but not to the extent necessary to move the guide rod or control rod 52 having the control cone 56. The electromechanical operation of the valve via the magnetic system 18 is therefore guaranteed in any case. The driver system or drive 82 permitting the motion of the armature piston 22 only in one direction of displacement, away from the valve seat 42, is another factor in aid thereof.

Heating of the fluid can result in a considerable volume expansion, wherein the volume expansion coefficient is considered to be approximately 0.0007 [1/K]. This results in a volume increase of $$V_1 = V_0(1+0.0007 \text{ [1/K]} \cdot \text{delta } T \text{ [K]}).$$

The compensation according to the invention, implemented by one single valve, can be used to reliably handle temperature-related volume increases in hydraulic working circuits and to limit any damaging pressure build-up.

While one embodiment has been chosen to illustrate the invention, it will be understood by those skilled in the art that various changes and modifications can be made therein without departing from the scope of the invention as defined in the claims.

The invention claimed is:

1. A 2/2-way seat valve, comprising:
   a joint valve body integrating a pressure limiting function and a thermal overpressure protection;

an inflow hole and an outflow hole in the valve body;
a valve piston being coupled to and actuated by a magnetic drive and interconnecting and separating the inflow hole and the outflow hole to and from, respectively, each other in a fluid-conveying manner, the magnetic drive having an armature piston mounted for longitudinal movement in a pole tube, the armature piston being electromechanically operated by an energizable solenoid so as to lift the valve piston off a valve seat in a valve housing being a part of the valve body and so as to open a fluid path from the inflow hole to the outflow hole; and
a linkage part and a control rod being connected to the armature piston and moving the armature piston, the linkage part extending out of a pressurized area of a fluid volume enclosed in the valve housing and in the pole tube, being a further part of the valve body and being coupled to and movable counter to an action of an energy accumulator in the valve body.

2. The 2/2-way seat valve according to claim 1 wherein the energy accumulator is a compression spring.

3. The 2/2-way seat valve according to claim 1 wherein the valve piston comprises a fixed orifice and a variable orifice.

4. The 2/2-way seat valve according to claim 3 wherein the variable orifice is actuated by the control rod, a first free end of the control rod having a control cone presetting a free opening cross section of the variable orifice.

5. The 2/2-way seat valve according to claim 2 wherein the linkage part is mechanically secured to a plate spring, a free end of the compression spring resting the plate spring; and
the plate spring and the compression spring are accommodated in a pole core as a further part of the valve body adjoining the pole tube as an extension.

6. The 2/2-way seat valve according to claim 5 wherein a free end of the linkage part transitions into a driver accommodated in the armature piston, the free end of the linkage part is accommodated in the armature piston so as to be longitudinally displaceable with a predeterminable axial motion clearance.

7. The 2/2-way seat valve according to claim 4 wherein a second free end of the control rod opposite the first free end of the control cone, is guided in a longitudinally movable manner in the armature piston with a predeterminable axial motion clearance.

8. A hydraulic system, comprising:
a 2/2-way seat valve, comprising:
a joint valve body integrating a pressure limiting function and a thermal overpressure protection;
an inflow hole and an outflow hole in the valve body;
a valve piston being coupled to and actuated by a magnetic drive and interconnecting and separating the inflow hole and the outflow hole to and from, respectively, each other in a fluid-conveying manner, the magnetic drive having an armature piston mounted for longitudinal movement in a pole tube, the armature piston being electromechanically operated by an energizable solenoid so as to lift the valve piston off a valve seat in a valve housing being a part of the valve body and so as to open a fluid path from the inflow hole to the outflow hole; and
a linkage part and a control rod being connected to the armature piston and moving the armature piston, the linkage part extending out of a pressurized area of a fluid volume enclosed in the valve housing and in the pole tube, being a further part of the valve body and being coupled to and movable counter to an action of an energy accumulator in the valve body; and
a piston end of a piston-rod-unit of a hydraulic cylinder connected to the inflow hole in the valve body.

9. The hydraulic system according to claim 8 wherein the energy accumulator is a compression spring.

10. The hydraulic system according to claim 8 wherein the valve piston comprises a fixed orifice and a variable orifice.

11. The hydraulic system according to claim 10 wherein the variable orifice is actuated by the control rod, a first free end of the control rod having a control cone presetting a free opening cross section of the variable orifice.

12. The hydraulic system according to claim 9 wherein the linkage part is mechanically secured to a plate spring, a free end of the compression spring resting the plate spring; and
the plate spring and the compression spring are accommodated in a pole core as a further part of the valve body adjoining the pole tube as an extension.

13. The hydraulic system according to claim 12 wherein a free end of the linkage part transitions into a driver accommodated in the armature piston, the free end of the linkage part is accommodated in the armature piston so as to be longitudinally displaceable with a predeterminable axial motion clearance.

14. The 2/2-way seat valve according to claim 11 wherein a second free end of the control rod opposite the first free end of the control cone, is guided in a longitudinally movable manner in the armature piston with a predeterminable axial motion clearance.

* * * * *